United States Patent
Westerinen et al.

(10) Patent No.: US 7,979,721 B2
(45) Date of Patent: Jul. 12, 2011

(54) ENHANCED PACKAGING FOR PC SECURITY

(75) Inventors: William J. Westerinen, Issaquah, WA (US); Todd L. Carpenter, Monroe, WA (US); Alexander Frank, Bellevue, WA (US); Shon Schmidt, Seattle, WA (US); Stephen Richard Drake, Seattle, WA (US); David James Foster, Bellevue, WA (US); Tse-Ching James Yu, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1227 days.

(21) Appl. No.: 11/612,436

(22) Filed: Dec. 18, 2006

(65) Prior Publication Data

US 2010/0037325 A1    Feb. 11, 2010

Related U.S. Application Data (63) Continuation-in-part of application No. 11/109,438, filed on Apr. 19, 2005, now Pat. No. 7,562,220, which is a continuation-in-part of application No. 11/022,493, filed on Dec. 22, 2004, which is a continuation-in-part of application No. 11/006,837, filed on Dec. 8, 2004, which is a continuation-in-part of application No. 10/989,122, filed on Nov. 15, 2004, now Pat. No. 7,610,631.

(51) Int. Cl.
*G06F 11/30* (2006.01)
*G06F 17/00* (2006.01)
*G06F 1/00* (2006.01)

(52) U.S. Cl. .............................. 713/189; 713/300; 713/1
(58) Field of Classification Search .................. 713/189, 713/300, 1
See application file for complete search history.

(56) References Cited

U.S. PATENT DOCUMENTS

| 6,690,556 B2 | 2/2004 | Smola et al. |
| 2006/0055506 A1 | 3/2006 | Nicolas |
| 2006/0107328 A1 | 5/2006 | Frank et al. |

OTHER PUBLICATIONS

Reconfiguration security for hardware agents in testing; Dan Mois, George; Flonta, Stelian; Stefan, Iulia; Enyedi, Szilard; Miclea, Liviu Cristian; Automation Quality and Testing Robotics (AQTR), 2010 IEEE International Conference on vol. 2; Publication Year: 2010, pp. 1-5.* Reconfigurable security protection system based on NetFPGA and embedded soft-core technology; Kai Zhang; Xiaoming Ding; Ke Xiong; Yunting Zhao; Computer Design and Applications (ICCDA), 2010 International Conference on vol. 5; Publication Year: 2010, pp. V5-540-V5-544.*

(Continued)

*Primary Examiner* — David Y Jung (57) ABSTRACT

A pay-per-use computer, or other electronic device that uses local security, may use a security module or other circuit for monitoring and enforcement of a usage policy. To help prevent physical attacks on the security module, or the circuit board near the security module, a second circuit may be mounted over the security module to help prevent access to the security module. Both circuits may be mounted on a interposer and the interposer mounted to the circuit board, creating a stack including the first circuit, the interposer, the security module, and a main PC board. When the PC board includes dense signal traces under the security module a three dimensional envelope is created around the security module. When the first circuit is a high value circuit, such as a Northbridge, the risk/reward of attacking the security module is increased substantially and may deter all but the most determined hackers.

17 Claims, 7 Drawing Sheets

OTHER PUBLICATIONS

A Proof of concept on defending cold boot attack; Joo Guan Ooi; Kok Horng Kam; Quality Electronic Design, 2009. ASQED 2009. 1st Asia Symposium on; Publication Year: 2009, pp. 330-335.*

International Search Report for PCT/US2007/087960 mailed Apr. 22, 2008.

Written Opinion for PCT/US2007/087960 mailed Apr. 22, 2008.

Eren et al., "Fringe-Effect Capacitive Proximity Sensors for Tamper Proof Enclosures" In: Proceedings of 2005 Sensors for Industry Conference, Feb. 8-10, 2005, pp. 22-25.

* cited by examiner

Fig. 6 ized hard-
ENHANCED PACKAGING FOR PC SECURITY

This application is a continuation-in-part of co-pending U.S. patent application Ser. No. 11/109,438, filed Apr. 19, 2005.

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network for a period of time. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates the account, and while the cellular telephone may power up, calls cannot be made because the service provider will not allow them. The deactivated phone has no "salvage" value, because the phone will not work elsewhere and the component parts are not easily salvaged nor do they have a significant street value. In most cases, however, even though the phone has been deactivated it is still capable of connecting to the service provider in order to arrange restoration of the account. When the account is brought current, the service provider will reconnect the device to network and re-authorize calling.

This model works well when the service provider, or other entity taking the financial risk of providing subsidized hardware, is able to enforce the terms of the contract as above, that is, by limiting use of the device to only those functions required to restore the account. When the device is more complex, such as a computer, merely limiting access to a network may not be sufficient to force a subscriber to comply with terms of a contract. Hardware security circuitry may be used to enforce the terms of the contract, but the hardware security circuitry itself may be subject to physical attack, bypassing, or removal.

SUMMARY

Physically mounting a hardware security circuit underneath a larger device, particularly a complex or high pin count device, such as a Northbridge, Southbridge, or processor chip, can make it difficult or impossible to mount a physical attack on the hardware security circuit. When interconnects between the hardware security circuit and the overlying device are restricted to the footprint of the larger device the overall security may be enhanced because an attack on the interconnect traces is made increasingly difficult. The addition of complex traces, such as data and address busses on the board-side of the mounted devices may reduce the risk of attackers cutting through from the back side of board.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior-art high-value computers, personal digital assistants, organizers, and the like, are not suitable for use in a pre-pay or pay-for-use business model as is. The ability to enforce a contract requires a service provider, or other enforcement entity, to be able to affect a device's operation even though the device may not be connected to the service provider, e.g. connected to the Internet. A first stage of enforcement may include a simple pop up warning, indicating the terms of the contract are nearing a critical point. A second stage of enforcement, for example, after pay-per-use minutes have expired or a subscription period has lapsed, may be to present a system modal user interface for adding value and restoring service. A provider's ultimate leverage for enforcing the terms of a subscription or pay-as-you go agreement is to disable the device. Such a dramatic step may be appropriate when it appears that the user has made a deliberate attempt to subvert the metering or other security systems active in the device.

Uses for the ability to place an electronic device into a limited function mode may extend beyond subscription and pay-per-use applications. For example, techniques for capacity consumption could be used for operating system licensing enforcement. Other applications may use multiple levels of performance limiting, based on the expected foreground task. For example, a test administration application may use one level of enforcement during the test and a second level of enforcement while the scores are being processed.

Figure 1:
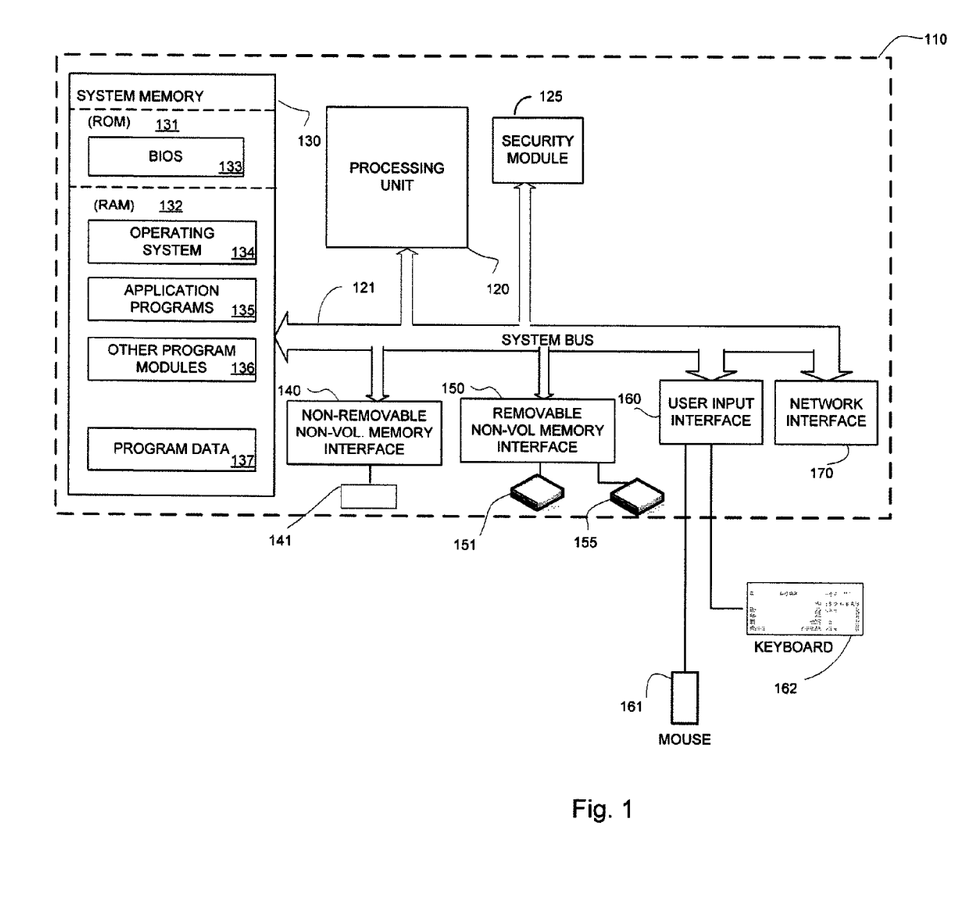
FIG. 1 is a block diagram of a logical view of a computer.

FIG. 1 illustrates a logical view of a computing device in the form of a computer 110 that may be connected to a network, such as local area network 171 or wide area network 173 and used in a pay-per-use or subscription mode. For the sake of illustration, the computer 110 is used to illustrate the principles of the instant disclosure. However, such principles apply equally to other electronic devices, such as those mentioned above. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may include a security module 125 (SM). The SM 125 may perform security monitoring, pay-per-use and subscription usage management, and policy enforcement related to terms and conditions associated with paid use, particularly in a subsidized purchase business model. The security module 125 may be embodied in many forms, for example, incorporated in an existing circuit device or as a standalone component.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor or other type of display device (not depicted) may also be connected to the system bus 121. The computer 110 may operate in a networked environment using logical connections to one or more remote computers over network interface 170.

Figure 2:
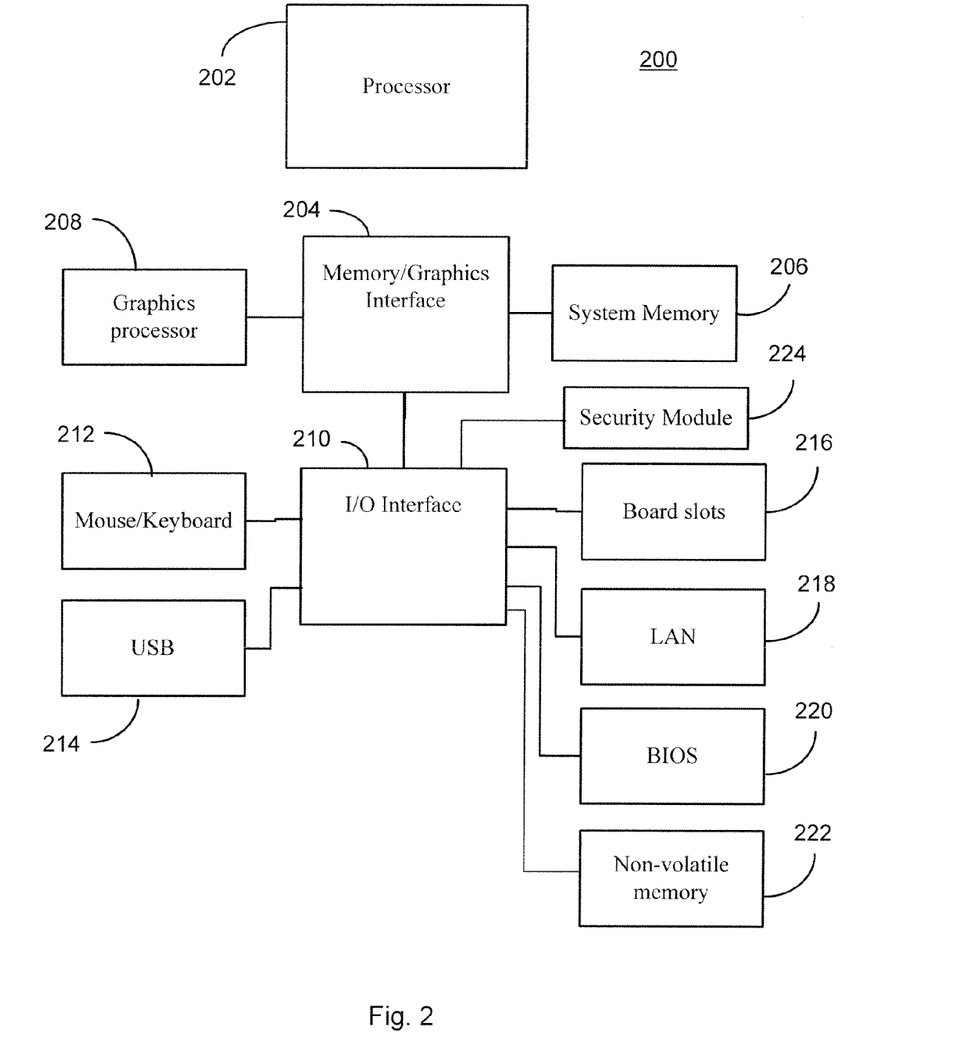
FIG. 2 is a block diagram of an architecture of a computer similar to the computer of FIG. 1.

FIG. 2 is an architectural diagram of a computer 200, the same as or similar to the computer 110 of FIG. 1. The architecture of the computer 200 of FIG. 2 may be typical of general-purpose computers widely sold and in current use. A processor 202 may be coupled to a graphics and memory interface 204. The graphics and memory interface 204 may be a "Northbridge" controller or its functional replacement in newer architectures, such as a "Graphics and AGP Memory Controller Hub" (GMCH). The graphics and memory interface 204 may be coupled to the processor 202 via a high speed data bus, such as the "Front Side Bus" (FSB), known in computer architectures. The processor 202 may also be connected, either directly or through the graphics and memory interface 204, to an input/output interface 210 (I/O interface). The I/O interface 210 may be coupled to a variety of devices represented by, but not limited to, the components discussed below. The I/O interface 210 may be a "Southbridge" chip or a functionally similar circuit, such as an "I/O Controller Hub" (ICH). Several vendors produce current-art Northbridge and Southbridge circuits and their functional equivalents, including Intel Corporation.

A variety of functional circuits may be coupled to either the graphics and memory interface 204 or the I/O Interface 210. The graphics and memory interface 204 may be coupled to system memory 206 and a graphics processor 208, which may itself be connected to a display (not depicted). A mouse/keyboard 212 may be coupled to the I/O interface 210. A universal serial bus (USB) 214 may be used to interface external peripherals including flash memory, cameras, network adapters, etc. (not depicted). Board slots 216 may accommodate any number of plug-in devices, known and common in the industry. A local area network interface (LAN) 218, such as an Ethernet board may be connected to the I/O interface 210. Firmware, such as a basic input output system (BIOS) 220 may be accessed via the I/O interface 210. Nonvolatile memory 222, such as a hard disk drive or any of the other non-volatile memories listed above, may also be coupled to the I/O interface 210.

A security module (SM) 224 is shown coupled to the I/O interface 210. Alternate embodiments may have the SM 224 coupled directly to the graphics and memory interface 204 or the processor 202.

In embodiments where the SM 224 is physically incorporated inside another architectural component, such as the processor 202, graphics and memory interface 204 or the I/O interface 210, the different capabilities of the various implementations allow varying levels of sophistication in execution and protection. A security module 224, located inside the processing unit 120, has access to virtually all the functions of the computer 110, or other electronic device. The instruction set may be reduced, processing speed may be restricted, etc. When inside the graphics and memory interface 204, memory limitations may be imposed, Further, because when the SM 224 is embedded in the processor or support chip it is virtually immune to hardware attacks and hardened against software attacks. However, embedding a security module inside a commercial processor or special function interface may be both time-consuming and costly.

A security module 224 may be separately packaged and placed in communication with the remaining functional elements of the computer through either a standard I/O interface, or through a dedicated bus. Because of the relative ease of implementation, this outboard approach may be useful when more sophisticated implementations, such as those described above, are not available. Because the outboard circuitry is more susceptible to attack, the SM 224 may require alternative methods of protection.

When attempting to enforce policies, such as pay-per-use operation of a computer or other standalone device, any circuit that provides security management will become a target for attack, both physical and logical. Logical attacks can be met by cryptographic means and secure processes for initialization and personalization of the circuit. Physical attacks that attempt to destroy, remove, or bypass the circuit may be met by packaging that places the circuit inside a tamper-resistant enclosure. For example, a high security environment such as a cryptographic module used in electronic banking, from companies such as Attica, have sensors that determine when the physical environment is being disturbed. Shock and temperature sensors can activate security measures as dramatic as self-destruction to prevent key matter from being compromised.

However, the cost of tamper sensors and self-destruct mechanisms may not be compatible with the business goals of delivering a pay-per-use product at a low initial investment. The use of existing high-value or essential components to provide a tamper-resistant barrier to protect a security circuit from physical attack may offer such as low-cost alternative.

Figure 3:
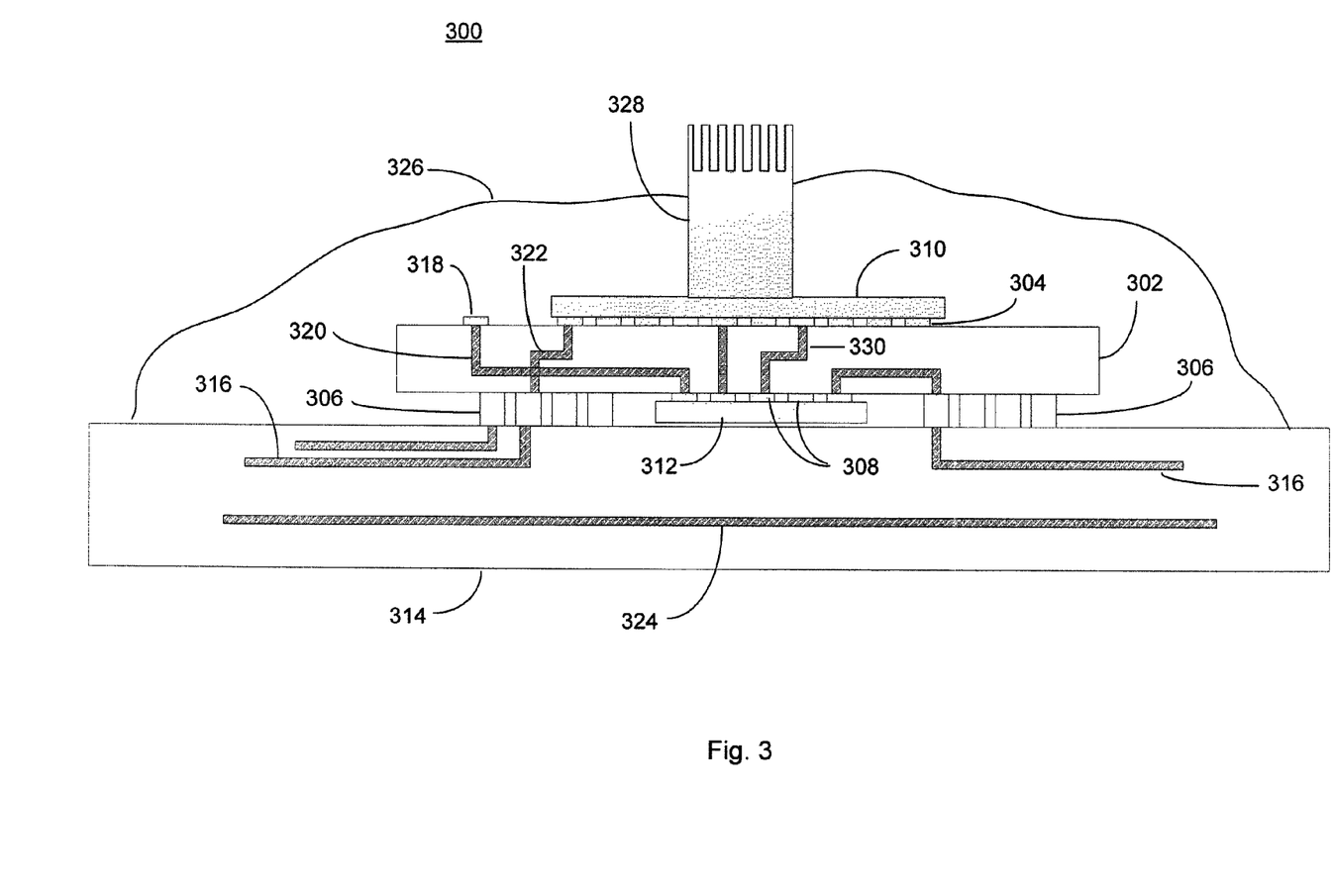
FIG. 3 is a simplified and representative apparatus for securing a security circuit on a circuit board.

FIG. 3, a simplified and representative section view of packaging for enhanced PC security is discussed and described. An apparatus 300 for enhancing security of a component may include an interposer 302, top-side connections 304 on the interposer 302, and first 306 and second 308 bottom-side connections on the interposer 304. A first circuit 310, such as the I/O interface 210 of FIG. 2, may be coupled to the top-side connections 304 and a second circuit 312, such as the security module 224 of FIG. 2, may be connected to the second bottom-side connections 308. The first bottom-side connections 306 may be connected to circuit board 314. The circuit board 314 may be a multilayer circuit board, for example, an FR4 substrate or similar. The interposer 302 may be constructed of the same material as the circuit board 314 to allow common manufacturing processes and to match physical properties, for example, thermal coefficient of expansion. However, the interposer 302 may also be a different material from the circuit board 314, for example, when heat dissipation characteristics are important, a ceramic substrate may be used.

Figure 6:
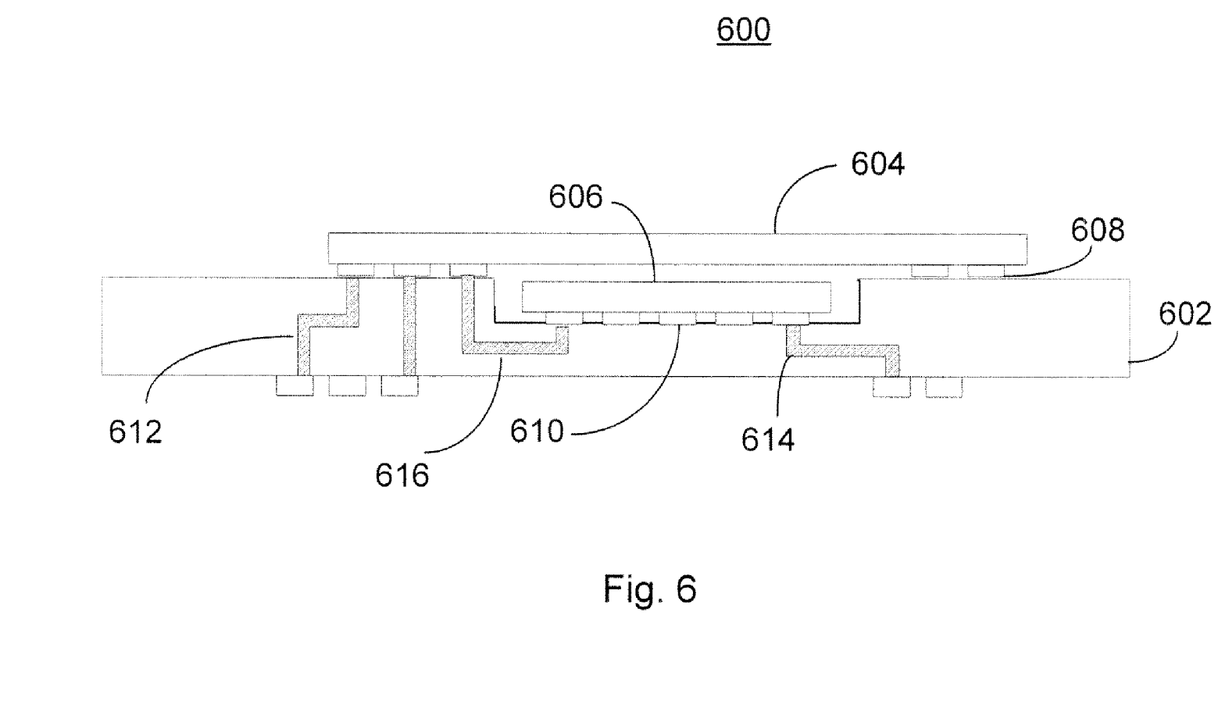
FIG. 6 is an alternate embodiment of securing a security circuit on a board.

The first bottom-side connections 306 may be thicker than the component-to-interposer connections to accommodate the thickness of the second circuit 312. Alternatively, either the interposer plating, the circuit board plating, or both may be thicker to accommodate the thickness. In another embodiment, the second circuit 312 may use a "chip on board" technique (not depicted) where the circuit die is attached and wire-bonded directly to the interposer with a thin encapsulation compound over the die and wire bonds for mechanical protection. Chip-on-board construction is well known in the industry. Interconnects 316 on the circuit board 314 may be used to provide signal connections from other components (not depicted) to the interposer 302 and its components, in this example, the first and second circuits 310 312. In another embodiment, the second circuit may be mounted in a bottom-side "well" in the interposer 302. A top-side well is depicted in FIG. 6 and is discussed in more detail below.

One or more signal connections, represented by trace 324 may be routed under the interposer 302. Such additional signal traces, power planes, ground planes, or a combination of these may be used to provide a barrier to access of the second circuit 312.

A test pad 318 may be connected by a signal path 320 from the top-side of the interposer 302 to the second circuit 312. Other signal connections on the interposer, represented by connection 322 may connect the first circuit 302 to either the circuit board 314 or the second circuit 312. In some embodiments, an encapsulation compound 326 may be used to cover the interposer 302 and related components. Encapsulation, with for example, an epoxy compound, may increase the difficulty of physically attacking the interposer 302 and its respective components 310 312. Mechanical removal of the epoxy can lead to damage to the top-side component 310 or connection traces on the circuit board 314. Chemical removal of the epoxy can lead to damage to the circuit board 314. A heat sink 328 may also be added, with or without the encapsulation to improve heat removal from the attached component, in this example, component 310.

While the embodiment illustrated shows a single top-side component 310 and a single bottom-side component 312, a combination of circuits, discrete components, multi-chip modules (MCM) or the like, can be added on either or both sides of the interposer 302.

When constructed in this manner, the second circuit 312 is effectively surrounded on the top, bottom, and sides by either circuitry or signal interconnects. A physical attack on the security circuit may necessarily involve removing the interposer by either unsoldering or cutting the interposer-to-circuit board connections 306, or removing the first circuit 312 and cutting through the interposer 302. Attempts to access the second circuit 312 via the backside may necessarily require cutting non-terminated connections, such as signal connections represented by trace 324 and terminated connections represented by traces 316. (Terminated or non-terminated defined by whether the trace has a node at the interconnect 306.) In a multilayer, high pitch (i.e. close, narrow traces) circuit board, even minor damage to the circuit board 314 may cause irreparable damage.

As in many security measures, it is unreasonable to believe that every possible attack can be thwarted. However, if the attack is so difficult to mount that either expensive, specialized equipment must be used, or if the risk of damage to expensive components is high, most attackers will be discouraged from the attempt. In the case of embodiments of this disclosure, a relatively simple security device, represented by second circuit 312 may be protected by high value or high pin count circuits. For example, a smart chip used to monitor pay-per-use compliance may be mounted under a Northbridge or Southbridge (or, in newer architectures, a GMCH or ICH) circuit, used for memory, graphics, or I/O control. Some circuits, such as Northbridge may not lend themselves to an interposer-based approach, but the configuration described below in FIG. 6 may be useful when high speed busses are coupled to the circuit in question. Because damage to either a Northbridge or Southbridge (or their equivalents) can completely disable a computer or other electronic device of similar architecture, it is unlikely a garage-shop hacker would attempt such an attack. Further, if the cost of the equipment required and the time-value equivalent of a successful hack exceeds the cost of the equipment being attacked, the economic motive for a hack may be eliminated.

To reinforce the value of the second circuit 312 as a security measure, the second circuit 312 may include power control, signal routing, or both between the circuit board 314 and the first circuit 310, for example, trace 330. In such an embodiment, because the first circuit 310, for example, a Northbridge, won't operate without the second circuit 312, even a surgical attack on the second circuit 312, for example, to cut its power, may not be effective.

The embodiment illustrated in FIG. 3 depicts standard electrical connections and circuit traces. However, alternative signal connections, such as optical connections, are equally supported and achieve the same goal of surrounding a security circuit by a combination of signal lines and other components.

Figure 4:
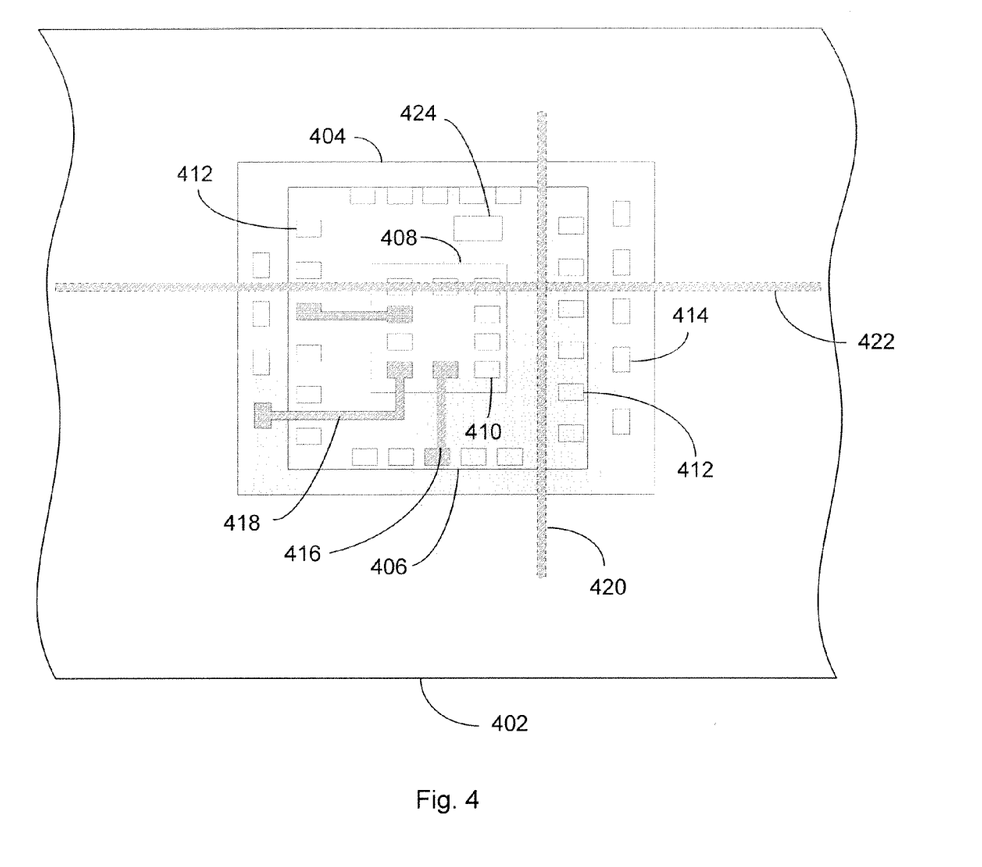
FIG. 4 is a top view of a simplified and representative apparatus for securing a security circuit on a circuit board.

FIG. 4 is a top view of an apparatus for securing a security circuit on a board. A circuit board 402 may be mounted with an interposer 404, that is, another circuit board or substrate on which is mounted a first circuit 406 and a second circuit 408. The second circuit 408 is shown with dashed lines, indicating it is underneath the interposer 406. The second circuit may be smaller than the first circuit, in size, pin count, or both. Connection pads 410 on the second circuit 408 may be coupled to the underside of the interposer 406 using known techniques, such as solder paste or ball grid array. While sockets may be used for attaching some of the components, for example, the bottom-side component 408, the overall effectiveness security of the apparatus may be increased when non-socketed attachments are used, especially for the top-side component, for example, first circuit 406. Connections 412 on the first circuit 406 may be coupled to the top-side of the interposer 404. The interposer 404 may have connection points 414 that are coupled or bonded to the circuit 402. Interconnections on the interposer 404 may connect the first 406 and second 408 circuits, such as interconnection 416. Similarly, interconnections on the interposer 404 may connect either circuit 406 408 to the circuit board 402, as shown by another exemplary connection 418.

As see from the top view of FIG. 4, the larger first circuit 406, physically on top of the smaller second circuit 408 provides a form of security shield to protect the smaller circuit from tampering. While this arrangement is illustrated, an arrangement with a smaller circuit on above a larger circuit (not depicted) may be equally effective if the interposer acts to limit access to the underlying pins and therefore creates effectively the same barrier to physical tampering. Similarly, as mentioned above, when using multi-layer circuits, an area under the second circuit 408 may be create a virtually 100% cover of the bottom of the chip using other circuit traces, both those terminating at the second circuit 408 or interposer 404. Such a cover of traces may serve to limit the ability to drill or laser cut through to the second circuit 408 in an attempt to disable it. When the second circuit 408 controls power or signal access to the first circuit 406, the value of attacking the second circuit 408 by drilling it out or cutting power its power lines is reduced or eliminated.

Additional security may be provided by placing additional circuitry on the bottom-side of the interposer 404. For example, a clock circuit such as a crystal-based time source 424 may also be provided under the first circuit 406. Any attempt to remove the interposer 404 to circumvent security provided by the second circuit 408 may jeopardize the time-source 424 and further reduce the risk-reward ratio of attempted tampering.

To help further secure the second circuit 408 from tampering signal lines 420 422 may be routed underneath the footprint of the interposer 404. Signal lines directly under the second circuit 408, such as signal line 422 may be particularly valuable in preventing tampering with the second circuit 408. The connections shown in FIG. 4 are limited for the sake of clarity. In practice, every pin of both circuits 406 408 will likely be connected to the interposer 404 and from it to either each other or the circuit board 402. The trace density in the area of the interposer increases the barrier to tampering because dense interconnects are more susceptible to damage during any attempt to disassemble the interposer 404 and circuit board 402.

Figure 5:
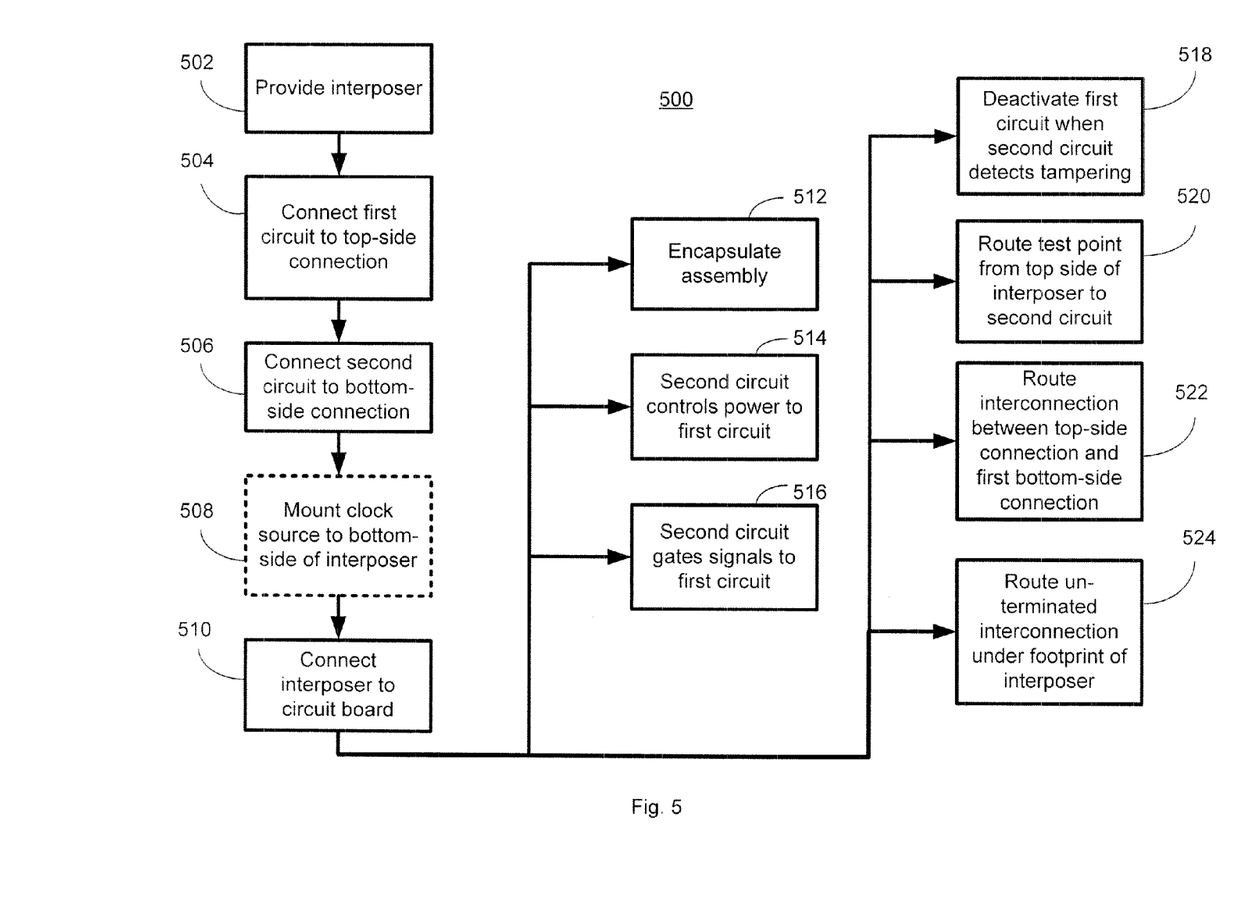
FIG. 5 is flow chart depicting a method of securing a circuit by surrounding it with other circuit components.

FIG. 5, a method 500 of providing physical security by surrounding a part with other circuit elements is discussed and described. At block 502, an interposer, such as interposer 302, may be provided having a top and bottom side, a set of top-side connections 304 and also having first 306 and second 308 sets of bottom-side connections with the second set of bottom-side connections 308 surrounded by the first set 306. The interposer 302 may also include at least one signal connection between the set of top-side connections and the first set of bottom-side connections. The interposer may further include a test point coupled to the first set of bottom-side components allowing test access to a circuit mounted to the first set of bottom-side connections.

At block 504, a first circuit 310 may be connected to the set of top-side connections 304. The connection between the first circuit 310 and the set of top-side connections 304 may be such that the two are in direct contact with each other, or with a thin connective coupling, such as solder or gold bumps, constituting an electro-mechanical connection. When thus directly connected, as opposed to connected via a socket or cable, the electro-mechanical connection forms a tamper-resistant barrier protecting the top surface of the interposer 302.

A second circuit 312 may be connected, at block 506, to the second set of bottom-side connections 308. Similar to the electromechanical connection of the first circuit 310, the second circuit 312 may be directly connected to the second set of bottom-side connections 308. However, because the second circuit 312 is essentially captured between the interposer 302 and the circuit board 312, in one embodiment, the second circuit 312 may be coupled using a socket or other removable attachment (not depicted).

At block 508, a clock source, such as a crystal-driven oscillator used to supply timing signals to an encompassing electronic device (e.g. device 200 of FIG. 2) may optionally be mounted to the first set of bottom-side connections 306.

At block 510, the second set of bottom-side connections 308 may be directly connected to corresponding connections on the circuit board 314. When mounted in this fashion, the second circuit 312 is effectively locked between the circuit board 314 and the interposer 302. The first circuit 310 increases the value of the interposer assembly to the point that only a dedicated hacker with sophisticated tools can effectively disconnect the interposer to access the second circuit 312. The risk of failure is damage to the first circuit 310, the interposer 302, and the circuit board 314, not to mention the second circuit 312.

Blocks 512-526 describe additional elements that may be incorporated to enhance the security of the second circuit 312, independently or in combination. At block 512, the entire interposer assembly, including the interposer 302 and first and second circuits 310 312 may be encapsulated using an epoxy or other known substance that requires drilling or chemical etching to remove. Either process is likely to damage the underlying components, thereby increasing the risk of damage and lowering the prospect of successfully circumventing the security offered by the second circuit 312. Block 514 provides that the second circuit 312 may be used to control power to the first circuit 310 such that a disabling attack on the die of the second circuit, for example, a microscopic laser cut through the circuit board 314, circuit board signal traces 324, and the second circuit package might disable the security services offered by the second circuit 312, but would also disable the first circuit 310 by not allowing it to power up. Simply overwiring to route power directly to the first circuit 310 may be virtually impossible if the power traces between the first and second circuits 310 312 are within the footprint of the first circuit 310 and not accessible mechanically without removing the first circuit 310. Trace 330 of FIG. 3 or trace 416 of FIG. 4 are examples of how such as power signal line may be within the footprint of the first circuit 310.

In a similar fashion, block 514 may provide a method of routing or gating signals to the first circuit 310 through the second circuit 312. An attempt to disable the second circuit 312 would then result in loss of signals to the first circuit 310, such as address or data lines or clock signal. At block 518, the second circuit 312 may be provided with a capability to detect tampering, either logical (software attacks) or physical, and using either signal lines or power control to disable the first circuit 310. Detecting a logical attack may involve velocity measurements of key usage or a number of invalid key presentations compared to valid key presentations. Hardware or physical attacks may analyzed using simple-to-implement sensors such as thermal sensors to determine if key-extraction maneuvers are in progress.

At block 520, one or more test points 318 may be routed from the top of the interposer 302 to the second circuit 312. The test point 318 may allow verification of settings or may be used to program the second circuit 312 through a single pin interface (SPI) bus.

At block 522, traces may be routed between the top-side set of connections 304 to the first set of bottom-side connections 308, that is, directly from the first and second circuits 310 312. As discussed above, such interconnections, especially when contained within the footprint of the first circuit, may be particularly tamper resistant. Other signal connections, or traces, at block 524 may be routed under the interposer, as discussed above, for use in improving the barrier to direct access of the second circuit 312. These other signal connections may be terminated at the first set of bottom-side connections 306 (i.e. at the interposer 302) or may not terminate at the interposer 302 and simply run under the interposer 302.

FIG. 6 is an alternate embodiment securing a circuit. In this embodiment, a well is formed in a circuit board 602 and a first circuit 604 is mounted over a second circuit 606. As in the other described embodiments, solder or other direction connections 608 may be made between the first circuit 604 and the circuit board 602. Similar direct connections 610 may be made between the second circuit 610 and the circuit board 602. As above, interconnections may be made between the first 604 and second 606 circuits within the footprint of the first circuit 604, such as connection 616. Other connections 612 and 614 may be respectively made between the first circuit 604, the second circuit 606 and the bottom of the circuit board 602. The circuit board 602 may then be mounted to another board and used as an interposer itself, or the circuit board 602 may be the main board of an electronic device and connections 612 and 614 may be routes to other circuit elements or connectors.

Figure 7:
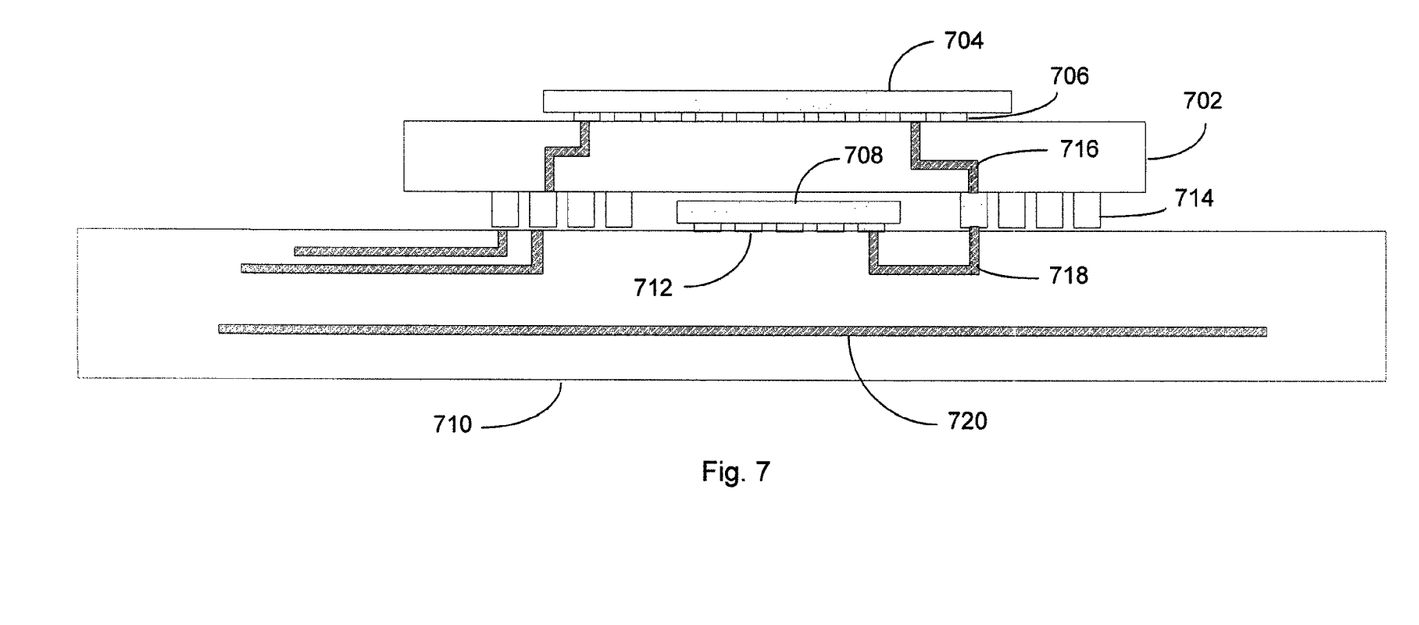
FIG. 7 is yet another alternate embodiment of securing a security circuit on a board.

FIG. 7 is yet another alternative embodiment of securing a circuit using a motherboard 702 with a first circuit 704 mounted electro-mechanically to a set of connections 706. The motherboard 702 may then be mounted over second circuit 708 on a circuit board 710. The motherboard 702 may be connected using connections 714. Traces 716 and 718 may connect the first circuit 704 to the second circuit 708. The traces 716 and 718 may be within the footprint of the first circuit 704 to help prevent tampering with signal and power connections between the two components 704 708. As above, trace 720 may be routed under the first circuit 704 to help protect both the second circuit 712 and intercomponent traces, such as trace 718 from attack via the bottom-side of the circuit board 710.

The use of high value or at least high pin count circuits and main board multi-layer signal connections or traces to protect a lower pin count circuit that provides security services provides a low cost but highly effective barrier to physical tampering. Both mechanical probing and cut-and-rewire attacks are made difficult, if not impossible, without physically removing either the high pin count circuit or its corresponding interposer. By increasing both the cost of the attack and risk of failure, the risk-reward ratio of mounting an attack can be lowered to the point where only the most serious of hackers will attempt such an attack and those with an economic motive will move on to other targets.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. An apparatus for enhancing security of a component comprising:
    an interposer with a top-side connection and first and second bottom-side connections;
    a first circuit mounted to the interposer and directly connected to the top-side connection;
    a second circuit mounted to the interposer and directly connected to the first bottom-side connection; and
    a circuit board directly connected to the second bottom-side connection of the interposer, whereby the second circuit is physically surrounded by a combination of the interposer above, the circuit board below and the second bottom-side connections to the side of the second circuit.

2. The apparatus of claim 1, further comprising a first signal connection between the top-side connection and the first bottom-side connection.

3. The apparatus of claim 1, wherein the first circuit has a higher pin count than the second circuit.

4. The apparatus of claim 1, wherein the second circuit comprises a security function operable at least in part to provide security for the first circuit.

5. The apparatus of claim 1, wherein the first circuit has a higher circuit complexity than the second circuit.

6. The apparatus of claim 1, wherein the circuit board comprises a plurality of signal paths that are not connected to the second bottom-side connection and that are circumscribed by the footprint of the interposer.

7. The apparatus of claim 1, wherein the interposer further comprises top-side test connections for providing electrical access to the second circuit.

8. The apparatus of claim 1, further comprising a heat sink.

9. A method of providing tamper-resistance to a circuit comprising:
    providing an interposer having a top and a bottom side, a set of top-side connections, a first set of bottom-side connections, and a second set of bottom-side connections, the first set of bottom-side connections surrounded by the second set of bottom-side connections;
    making a direct connection of a first circuit to the set of top-side connections; making a direct connection of a second circuit to the first set of bottom-side connections;
    making a direct connection of the second set of bottom-side connections to a circuit board, whereby the second circuit is surrounded by the interposer, the circuit board, and the second set of bottom-side connections.

10. The method of claim 9, wherein providing the interposer comprises providing the interposer having at least one signal connection between the set of top-side connections and the first set of bottom-side connections.

11. The method of claim 9, wherein providing the interposer comprises providing the interposer with the set of top-side connections including a test point coupled to the first set of bottom-side components.

12. The method of claim 9, further comprising providing at least one signal path from the circuit board to the first circuit through the second circuit.

13. The method of claim 9, further comprising encapsulating the first and second circuits and the interposer with an encapsulation compound.

14. The method of claim 9, further comprising mounting a clock source to the bottom side of the interposer.

15. The method of claim 9, further comprising controlling power to the first circuit at the second circuit.

16. The method of claim 9, further comprising gating signal transmissions to the first circuit at the second circuit.

17. The method of claim 9, further comprising routing a plurality of signal traces under the interposer, the signal traces unconnected to the second set of bottom-side connections.

* * * * *